Jan. 24, 1928.
F. D. HOLDSWORTH
1,657,199
MOTOR DRIVEN COMPRESSOR
Filed June 30, 1921    2 Sheets-Sheet 1
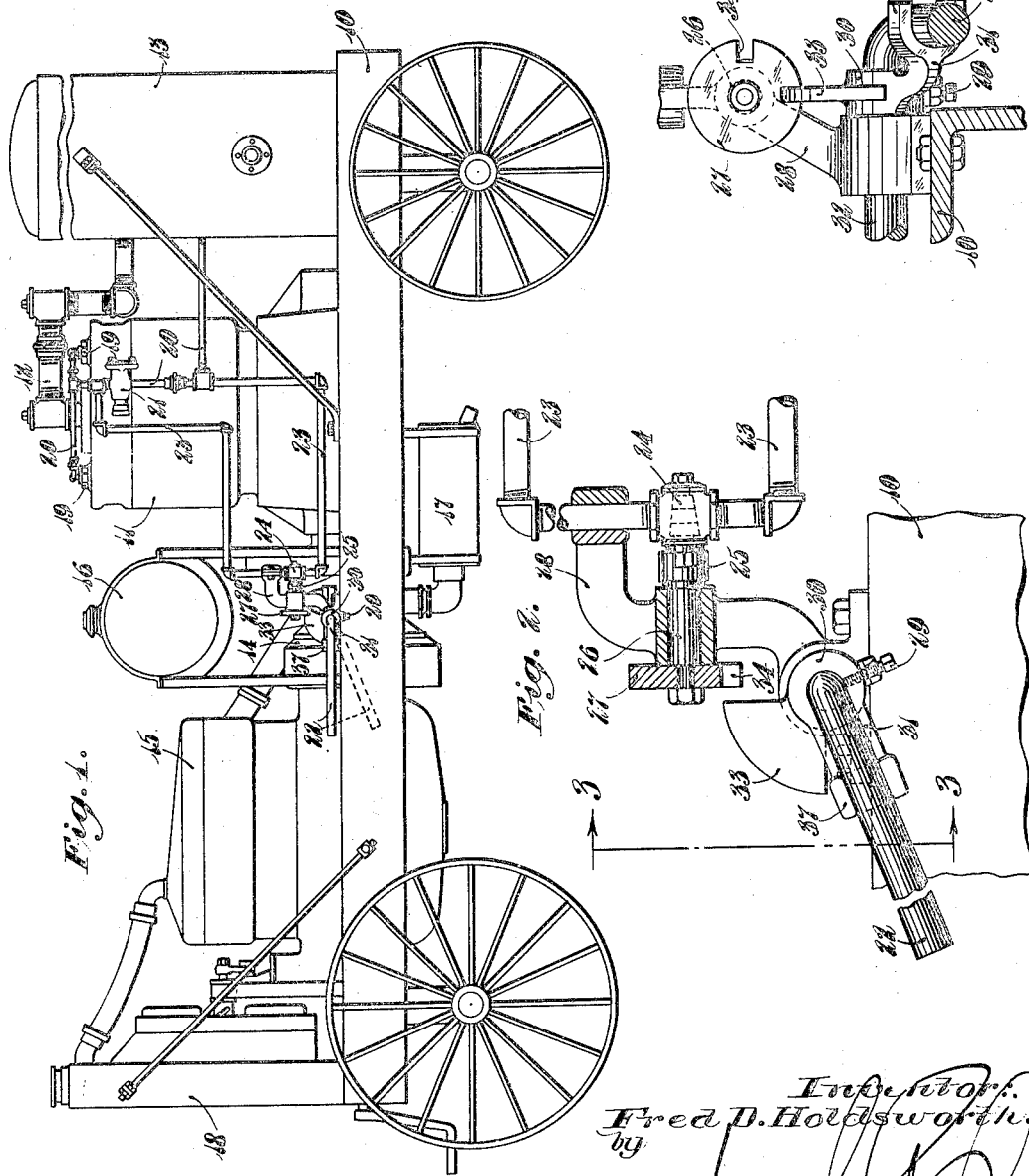
Inventor:
Fred D. Holdsworth,
by
Atty.

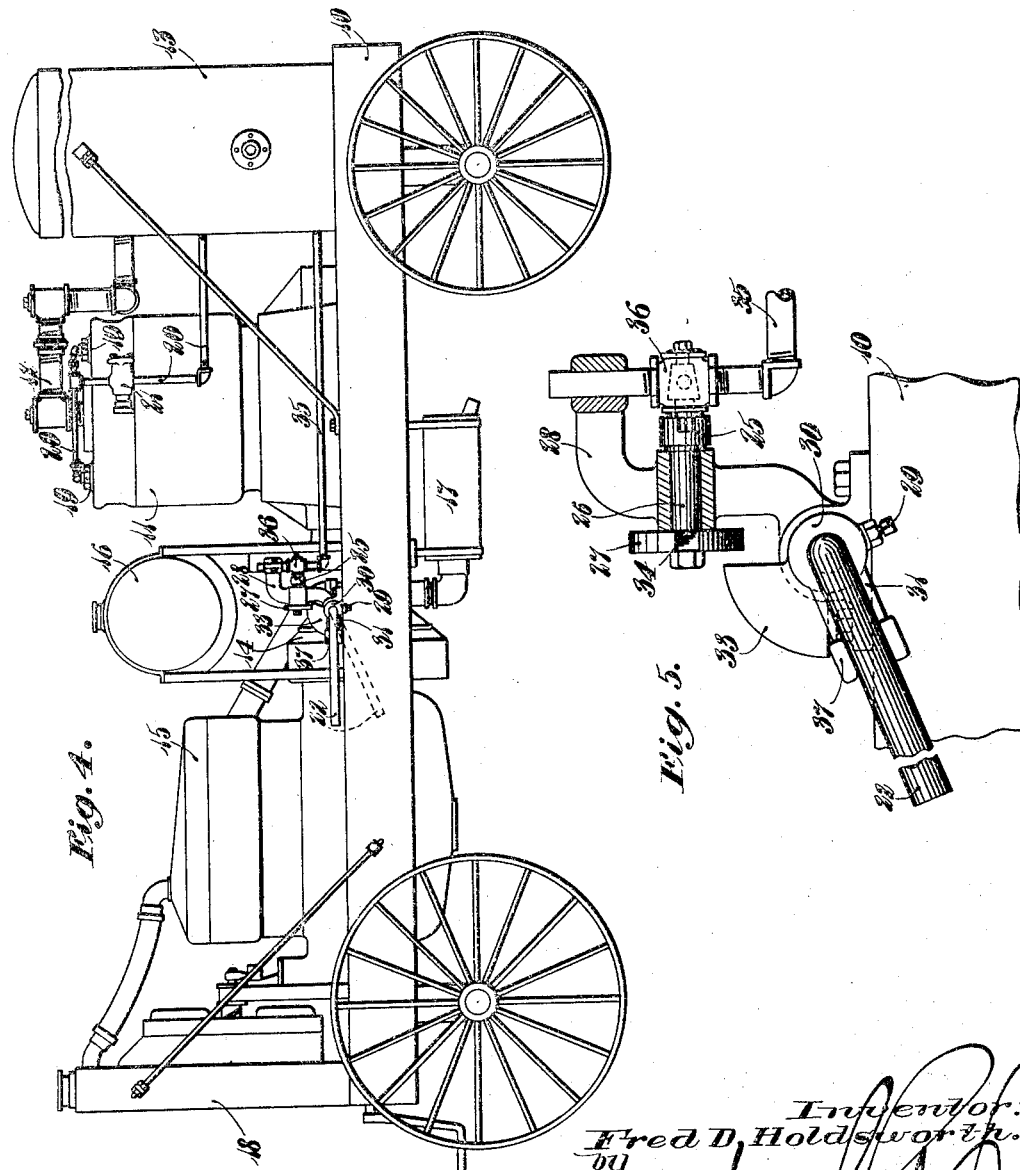

Patented Jan. 24, 1928.

1,657,199

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS.

MOTOR-DRIVEN COMPRESSOR.

Application filed June 30, 1921. Serial No. 481,614.

This invention relates to motor driven compressors and especially, although not exclusively, to compressors driven by internal combustion engines and connected therewith by clutch devices.

In the operation of such compressor plants, it is necessary that the clutch be disconnected when the engine is started and highly desirable that the compressor be unloaded when the clutch is thrown in, or when the compressor is otherwise started, in order to avoid stalling the motor and to permit the compressor to be brought up to its normal operating speed before being fully loaded.

The present invention has, therefore, for its general object to provide simple and effective means whereby the controlling mechanism for the compressor actuating means, and particularly the controller or operating lever for the clutch connecting the motor and compressor, may be coordinated with means for controlling the load on the compressor in such a manner as to insure an unloaded condition of the compressor at the time of starting the same by throwing in the clutch or otherwise, at the same time providing for the loading of the compressor after its starting, and insuring the subsequent unloading thereof when stopped, thereby leaving the same in an unloaded condition when again started.

The foregoing and other more particular objects of the invention, together with means whereby the same may be carried into effect, will best be understood from the following description of certain forms or embodiments thereof illustrated in the accompanying drawings, in which:

Fig. 1 is a side elevation of a clutch controlled, portable, internal combustion engine driven compressor having applied thereto one form of the invention.

Fig. 2 is an enlarged side elevation, partly in section, showing the interlock between the clutch controlling lever and the unloading valve.

Fig. 3 is a section taken substantially on the line 3—3 of Fig. 2.

Fig. 4 is a view similar to Fig. 1 showing a modified form of the invention.

Fig. 5 is a view similar to Fig. 2 but showing the form of the invention illustrated in Fig. 4.

The embodiments of the invention illustrated in Figs. 1 and 4 are both shown as applied to a portable compressor plant comprising a vehicle 10 of any suitable construction and upon which is mounted a compressor 11 which may be of any well-known type, said compressor discharging, through suitable piping 12, into a receiver 13, and being driven, through suitable clutch mechanism 14, by an internal combustion engine 15, preferably of the motor vehicle type, supplied with fuel from a tank 16 and provided with the usual exhaust muffler 17 and cooling system including a radiator 18. The compressor 11 may be provided with the usual unloading devices 19 of well known form for automatically unloading the compressor when the pressure in the receiver 13 reaches the predetermined amount, said unloading devices being operated by fluid pressure from said receiver admitted through piping 20 and under the control of an automatic, pressure controlled pilot valve 21. The unloading devices 19 and pilot valve 21, being well known in the art, are not shown in detail herein and require no further description.

The clutch device 14 is operated or controlled by a hand lever 22 movable into the position shown in full lines in Figs. 1 and 4 to throw out the clutch and disconnect the compressor and engine, or into the position shown in Figs. 2 and 5 and in dotted lines in Figs. 1 and 4 to throw in the clutch and operatively connect said compressor and engine.

The form of the invention shown in Figs. 1 to 3 comprises a by-pass 23 extending about the pilot valve 21 and controlled by a manually operated valve 24. The valve 24 is connected by a clutch 25 with a rotary stem 26 provided at its outer end with an operating disk or hand wheel 27. The stem 26 is journaled in a bracket 28, bolted or otherwise secured to the frame of the vehicle 10, and in which the shaft 32 (Fig. 3) of the clutch controlling lever 22 is also journaled, said bracket serving further as a support for an adjacent portion of the piping constituting the by-pass 23. Secured, as by a set screw 29, to the shaft 32 of the clutch controlling lever 22, is a collar 30 having an arm 31 formed with a forked and laterally offset end 37 to embrace the lever 22 and thereby fix the angular position of said collar on said shaft, said collar being further provided with a segmental flange or wing 33 adapted to cooperate with the disk 27 to constitute an interlock between said clutch controlling lever and the unloading valve 24. The disk 27 and flange 33 are so relatively disposed that the edge of said disk lies in the path of movement of said flange when the lever 22 is moved to operate the clutch, said flange, when the lever 22 is in clutch connecting position, lying at one side of said disk, as shown in Fig. 2, and said disk having a notch 34 which, when the valve 24 is opened, or turned into the position to cause the compressor to be unloaded, lies in the path of movement of the flange 33, as shown in Fig. 2, thereby permitting the lever 22 to be moved from the clutch connecting to the clutch releasing position shown in Fig. 1, said movement of said lever causing the flange 33 to enter the notch 34 and thereby lock the valve 24 in unloading position.

When the compressor is idle, the parts occupy the position shown in full lines in Fig. 1, the lever 22 being in clutch releasing position, and the valve 24 being turned into unloading position and being locked in such position by engagement of the flange 33 with the notch 34 in the disk 27. When, therefore, the lever 22 is moved from the position shown in full lines in Fig. 1 into the position shown in Fig. 2 to connect the clutch and start the compressor, said compressor will be in unloaded condition so as not to throw any sudden or heavy load upon the motor when connected therewith. Movement of the lever 22 to throw in the clutch carries the flange 33 out of the notch 34, as shown in Fig. 2, thereby unlocking the disk 27 and permitting the valve 24 to be turned to load the compressor after the latter has been started. The parts will then occupy the position shown in Fig. 3, in which position it will be observed that the notch 34 in the disk 27 has been carried out of alinement with the flange 33, thereby locking the lever 22 in clutch engaging position. Before said lever can be moved into clutch releasing position to stop the compressor, the disk 27 must first be turned into the position to bring the notch 34 into alinement with the flange 33, thereby unloading the compressor. Movement of the lever 22 into the clutch releasing position will then cause the flange 33 to enter the notch 34, thereby locking the valve 24 in unloading position and preventing operation thereof to load the compressor until after the lever 22 has again been operated to throw in the clutch.

In the form of the invention shown in Figs. 4 and 5 there is provided (in lieu of the by-pass 23 by which the normally automatically controlled unloading devices may be manually controlled) a pipe 35 leading from the receiver 13 and discharging to the atmosphere, said pipe having interposed therein a valve 36. When the valve 36 is turned into open position, the compressed fluid in the receiver 13 is free to escape through the pipe 35, thus discharging the receiver. Between the valve 36 and the clutch controlling lever 22 are interlocking devices (which are substantially similar to those in the form of the invention first described, and which will therefore be understood without further description) whereby, before the lever 22 can be moved into the position to disengage the clutch and stop the compressor, the valve 36 must be turned into open position to discharge the receiver, being locked in this position by engagement of the flange 33 in the notch 34 of the disk 27, as shown in full lines in Fig. 4. When, therefore, the lever 22 is again operated to start the compressor, the receiver 13 will be substantially empty, thereby permitting the compressor to start in a substantially unloaded condition. Movement of the lever 22 into the position shown in Fig. 5 to throw in the clutch, releases the flange 33 from the notch 34, thereby permitting the disk 27 to be turned into the position shown in the last named figure to close the valve 36, and permitting the pressure to be built up in the receiver 13 so as gradually to load the compressor.

From the foregoing it will be seen that both forms of the invention provide a compressor unloading valve so coordinated with the controller for operatively connecting the compressor with the driving motor that before the compressor can be stopped it must be unloaded, and that after having been stopped it cannot be loaded until after it has been again started, thereby insuring the starting of the compressor in unloaded condition and effectually preventing all danger of attempting to start the compressor against receiver pressure and the consequent stalling of the motor.

While I have in this specification shown and described in detail certain embodiments which my invention may assume in practice, it is to be understood that these forms have been chosen for illustrative purposes merely, and that the invention may be otherwise embodied and practiced without departing from its spirit or the scope of the claims hereunto appended.

What I claim as new and desire to secure by Letters Patent is:

1. The combination with a compressor and actuating means therefor, of means for starting and stopping said compressor, means for loading and unloading the same, and an interlock between said starting and stopping means and said loading and unloading means whereby each controls operation of the other.

2. The combination with a compressor and actuating means therefor, of means for starting and stopping said compressor, and means for loading and unloading the same adapted to prevent stopping of said compressor when the same is loaded.

3. The combination with a compressor and actuating means therefor, of a controller for starting and stopping said compressor, and an unloading valve for said compressor having a notched disk adapted to lock said controller against movement to stop said compressor when said valve is in position to load the same.

4. The combination with a compressor and actuating means therefor, of means for loading and unloading said compressor, and means for starting and stopping the same operable without effecting movement of the loading and unloading means and adapted to prevent loading of said compressor when stopped.

5. The combination with a compressor and actuating means therefor, of a controller for starting and stopping said compressor, means for loading and unloading the same, and cooperating means carried by said controller and loading and unloading means, respectively, to prevent stopping of said compressor when it is loaded and to prevent loading of said compressor when it is stopped.

6. The combination with a compressor and actuating means therefor, of means for loading and unloading said compressor, and a controller for starting and stopping said compressor, said controller having a segmental flange adapted to lock said loading and unloading means against operation to load said compressor when said controller is in position to stop the same.

7. The combination with a compressor and actuating means therefor, of a controller for starting and stopping said compressor, said controller having a segmental flange, and a loading and unloading valve for said compressor provided with a notched disk, said flange and disk cooperating to lock said controller against operation to stop said compressor when said valve is in a position to load the same, and to lock said valve against operation to load said compressor when said controller is in position to stop the same.

8. The combination with a compressor, an internal combustion engine, and a clutch connecting said engine and compressor, of a lever for controlling said clutch, a valve for unloading said compressor, and an interlock between said lever and valve whereby each controls operation of the other.

9. The combination with a compressor, a receiver therefor, means for actuating said compressor, and devices operated by receiver pressure for loading and unloading said compressor, of means for starting and stopping said compressor and for compelling the unloading thereof by said devices before it is stopped.

10. The combination with a compressor, a receiver therefor, means for actuating said compressor, and devices operated by receiver pressure for loading and unloading said compressor, of a controller for starting and stopping said compressor, a controller for said loading and unloading devices, and an interlock between said controllers.

11. The combination with a compressor, a receiver therefor, devices operated by receiver pressure for loading and unloading said compressor, an internal combustion engine for driving said compressor, and a clutch for connecting said engine and compressor, of a lever for controlling said clutch, a valve for controlling said loading and unloading devices, and means necessitating operation of said valve to unload said compressor before said lever is moved to disengage said clutch.

12. The combination with a compressor, a receiver therefor, devices operated by receiver pressure for loading and unloading said compressor, an internal combustion engine for driving said compressor, and a clutch for connecting said engine and compressor, of a lever for controlling said clutch, and a valve for controlling said loading and unloading devices, said valve and lever having cooperating means for locking said lever against operation to disengage said clutch when said valve is in position to load said compressor.

13. The combination with a compressor, a receiver therefor, means for actuating said compressor, devices operated by receiver pressure for loading and unloading said compressor, and an automatic valve for controlling said devices, of a controller for starting and stopping said compressor, a by-pass about said automatic valve, a manually operated valve for controlling said by-pass, and means necessitating operation of said manually operated valve to unload said compressor before said controller is operated to stop the same.

14. The combination with a compressor, a receiver therefor, actuating means for said compressor, and devices operated by receiver pressure for loading and unloading said compressor, of a plurality of manually operated means, each controlling the other, for starting and stopping said compressor and for controlling said loading and unloading devices.

15. The combination with a compressor, a receiver therefor, devices operated by receiver pressure for loading and unloading said compressor, an automatic valve for controlling said devices, an internal combustion engine for driving said compressor, and a clutch for connecting said engine and compressor, of a lever for controlling said clutch, a by-pass about said automatic valve, a manually operated valve for controlling said by-pass, and means necessitating operation of said manually operated valve to unload said compressor before said lever is moved to disengage said clutch.

16. The combination with a compressor, a receiver therefor, devices operated by receiver pressure for loading and unloading said compressor, an internal combustion engine for driving said compressor, and a clutch for connecting said engine and compressor, of a lever for controlling said clutch, and a valve for controlling said loading and unloading devices, said valve and lever having cooperating means for locking said valve against operation to load said compressor when said lever is in position to disengage said clutch.

17. The combination with a compressor, a receiver therefor, devices operated by receiver pressure for loading and unloading said compressor, an internal combustion engine for driving said compressor, and a clutch for connecting said engine and compressor, of a lever for controlling said clutch, and a valve for controlling said loading and unloading devices, said valve and lever having cooperating means for locking said lever against operation to disengage said clutch when said valve is in position to load said compressor, and for locking said valve against operation to load said compressor when said lever is in position to disengage said clutch.

18. The combination with a compressor, a receiver therefor, devices operated by receiver pressure for loading and unloading said compressor, an automatic valve controlling said devices, an internal combustion engine, and a clutch connecting said engine and compressor, of a lever for controlling said clutch, a by-pass about said automatic valve, a manually operated valve for controlling said by-pass, and means for compelling operation of said valve to unload said compressor before said lever is operated to disengage said clutch.

19. The combination with a compressor, a receiver therefor, devices operated by receiver pressure for loading and unloading said compressor, an automatic valve for controlling said devices, an internal combustion engine, and a clutch connecting said engine and compressor, of a lever for controlling said clutch, said lever having a segmental flange, a by-pass about said automatic valve, a manually operated valve for controlling said by-pass, and a notched disk connected with said valve, said flange and disk cooperating to lock said lever against operation to disengage said clutch when said valve is in a position to load said compressor, and to lock said valve against operation to load said compressor when said lever is in a position to disengage said clutch.

20. The combination with a compressor, actuating means for said compressor, and unloading means for said compressor, of means for starting and stopping said compressor, an automatic controlling mechanism for said unloading means, and a manual controlling mechanism for said unloading means, one of said controlling mechanisms being adapted to operatively control said starting and stopping means.

21. The combination with a compressor, actuating means for said compressor, and unloading means for said compressor, of means for starting and stopping said compressor, an automatic controlling mechanism for said unloading means, and a manual controlling mechanism for said unloading means, one of said controlling mechanisms being necessarily in position to unload said compressor when said starting and stopping means starts the compressor.

22. The combination with a compressor, actuating means for said compressor, and unloading means for said compressor, of means for starting and stopping said compressor, an automatic controlling mechanism for said unloading means and a manual controlling mechanism for said unloading means, said manual controlling means being adapted to have an operative connection with said starting and stopping means and said automatic controlling mechanism being rendered inoperative when said manual controlling mechanism is operated to unload said compressor.

23. The combination with a compressor, actuating means for said compressor, unloading means for said compressor and a receiver for said compressor, of means automatically governed by receiver pressure for controlling said unloading means, and mutually controlled manual means for stopping and starting said compressor and for controlling said unloading means whereby the manual means for stopping and starting said compressor is adapted to control the manual means for controlling said unloading means, and the manual means for controlling said unloading means is adapted to control the manual means for stopping and starting said compressor.

24. The combination with a compressor, actuating means for said compressor, unloading means for said compressor, and a receiver for said compressor, of means automatically governed by receiver pressure for controlling said unloading means, and a manual control for said unloading means, said manual control also being adapted to influence the operation of said actuating means.

25. The combination with a compressor, actuating means for said compressor and unloading means for said compressor, of means to automatically control said unloading means when the compressor is running, and a manual controlling mechanism operable independently of said automatic control means to control said unloading means to effect unloading when the compressor is not running, said manual control being adapted to influence the operation of said compressor.

26. In combination with a compressor and actuating means therefor, of means to start and stop said compressor, means to load and unload the same operable separately from said starting and stopping means, and mechanical means to prevent simultaneous starting and loading of said compressor.

27. In combination with a compressor and actuating means therefor, of means to start and stop said compressor, means to load and unload the same operable separately from said starting and stopping means, and means to prevent simultaneous starting and loading of said compressor.

28. The combination with a compressor and actuating means therefor, of means to start and stop said compressor, means controlled manually separately from said starting and stopping means to load and unload said compressor, and automatic means for effecting the loading of said compressor and operative when said manually controlled means are inoperative.

29. The combination with a compressor, a receiver therefor, means for actuating said compressor, and devices operated by receiver pressure for loading and unloading the same, of means for starting and stopping said compressor, and controlling means for said receiver pressure operated devices having a controlling relation with the starting and stopping means for compelling starting of the compressor unloaded.

30. The combination comprising a compressor, actuating means therefor, pressure fluid controlled unloading means therefor, means adapted to vary the amount of power transmitted from said actuating means to said compressor only after said unloading means is released, and means for controlling said actuating means independently of said latter means.

31. The combination comprising a compressor, actuating means therefor, unloading means therefor, means operative upon movement to vary the operation of said compressor, and means necessitating unloading the compressor prior to movement varying the operation of the compressor including means constituting a bar to such movement until unloading is effected.

32. The combination comprising a compressor, actuating means therefor, unloading means therefor, means operative upon movement to vary the power flow from said actuating means to said compressor, and means necessitating unloading the compressor prior to movement varying the power flow to the compressor including means constituting a bar to such movement until loading is effected.

33. The combination comprising a compressor, actuating means therefor, unloading means therefor, and means for affecting the power flow from said actuating means to said compressor, said latter means and unloading means having mutually interlocking controls providing a dependent mechanically controlled operative relation.

34. The combination with a compressor and actuating means therefor, of a controller for starting and stopping the compressor, and means mechanically controlled by said controller and operative only when the latter is in compressor starting position, for permitting loading of the compressor and requiring movement to unloading position before the controller is movable to compressor stopping position, said means being movable without moving the controller.

In testimony whereof I affix my signature.

FRED D. HOLDSWORTH.